Oct. 18, 1960 W. LYONS 2,956,367

BASE CABINET ATTACHMENT FOR TELEPHONES

Original Filed Nov. 8, 1956 2 Sheets-Sheet 1

INVENTOR.

William Lyons

Oct. 18, 1960 W. LYONS 2,956,367

BASE CABINET ATTACHMENT FOR TELEPHONES

Original Filed Nov. 8, 1956 2 Sheets-Sheet 2

INVENTOR.

William Lyons 2,956,367
Patented Oct. 18, 1960

1

2,956,367

BASE CABINET ATTACHMENT FOR TELEPHONES

William Lyons, 971 Columbus Ave., New York, N.Y.

Substituted for abandoned application Ser. No. 621,153, Nov. 8, 1956. This application Dec. 3, 1957, Ser. No. 700,417

1 Claim. (Cl. 45—.5)

This invention relates to an improved service base for commercial telephones, one of the objects of the present invention is to provide a service base which may be quickly and positively connected to the body of a standard customer telephone set, which includes a box containing the circuit controls and supporting the rotary dial, with the usual combined telephone receiver and transmitter, which is mounted on a line controlling saddle, and which will not be accidentally separated from the telephone body, and further will in no way interfere with the service use of the telephone, while it provides enclosures for stamps, notes, messages received and transmitted, and for an index of important public business and private call numbers.

Another object of the invention is the provision of a service base for telephones which is provided with screw operated clamping rings or frames, which may be positively secured to the pads on the base of commercial telephones, so that the attached base will not be accidently displaced, and which may be readily detached by the customer when the telephone service is discontinued for any reason, as by removals or otherwise.

A further object of the invention is the provision of a service cabinet for commercial telephone sets, which includes a box having means for clamping the pads of a telephone set, and containing forwardly sliding drawers for personal objects, and laterally sliding drawers, one of which is provided with a telephone index.

Another object of the invention is to provide an attachable service base for telephone sets with a magnet attached to each end of the service base, and means in additional to the magnets for securing the service base to a telephone without altering the standard connections or construction.

With the above and other objects in view, the invention comprises certain new and useful constructions, combinaations, and arrangements of parts clearly described in the following specification of the accompanying drawings in which.

2

Figures 9, 14, 15, 16, 17:
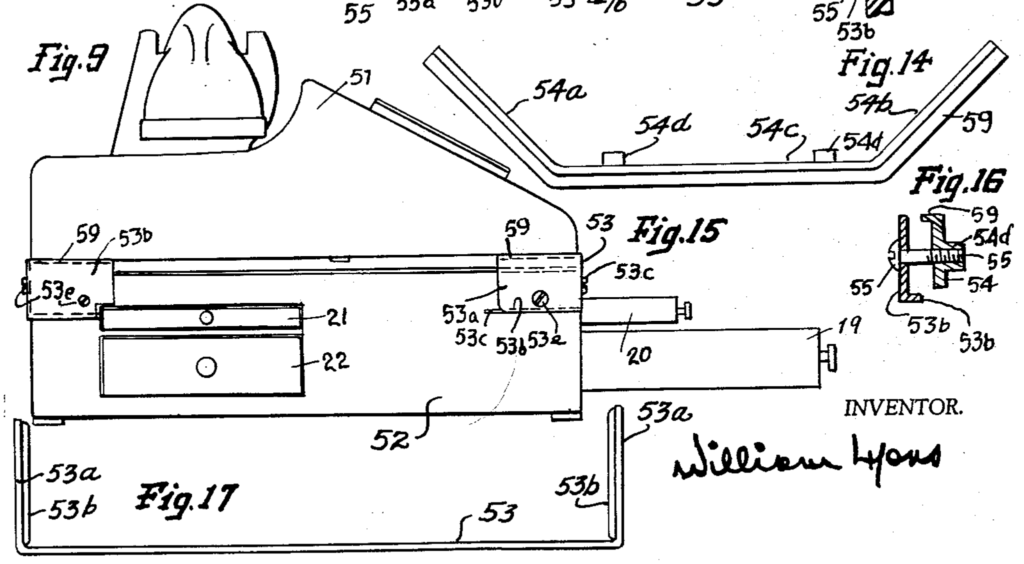

Fig. 9 is a side elevation of a modified form.

Figure 10:
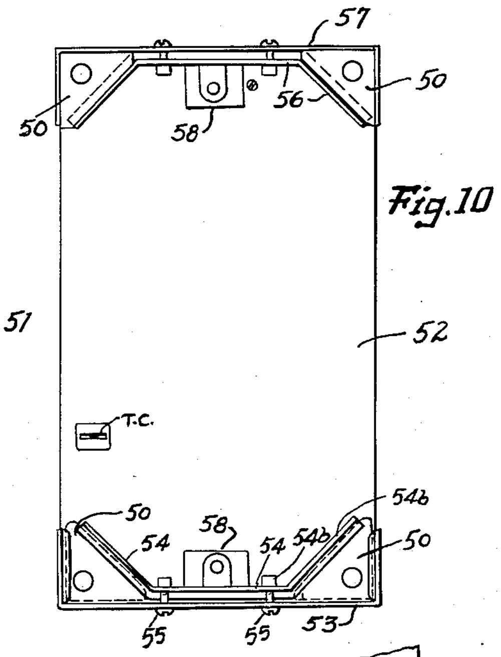

Fig. 10 is a horizontal sectional view between the telephone set and the service base, showing a modified clamp.

Figure 11:
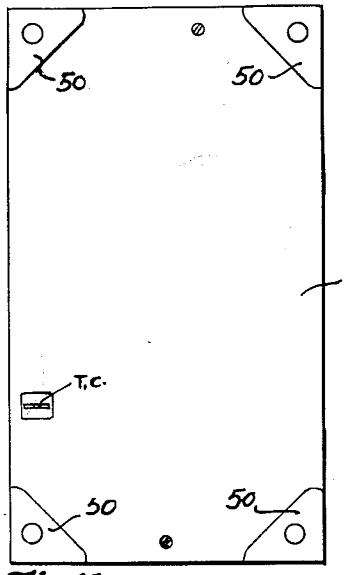

Fig. 11 is a bottom plan view of the telephone set.

Figures 12, 13:
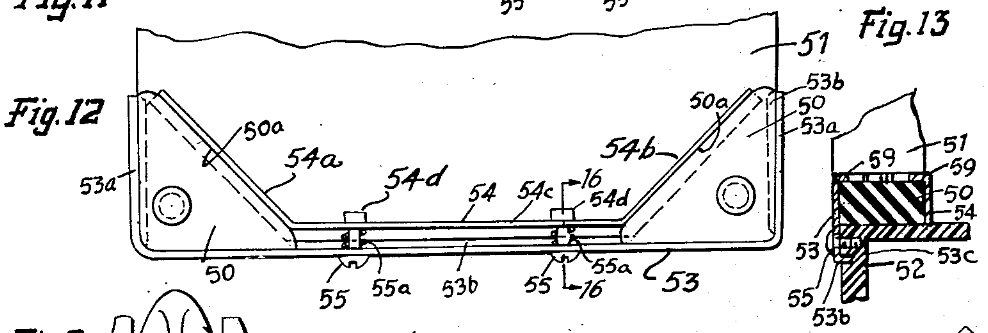

Fig. 12 is a top plan view of one end of the service base, shown broken away, and showing the modified pad clamping means.

Fig. 13 is a detail sectional view taken on line 13—13 of Fig. 12, looking in direction of arrows.

Fig. 14 is a detail plan view of one of the clamping members, in this one the inner clamping member.

Fig. 15 is detail sectional view.

Fig. 16 is a detail sectional view, showing the screw which clamps the inner and outer clamping members against the pad.

Fig. 17 is a detail plan view of the outer clamping member.

Referring to Figs. 1 to 8 inclusive, 10 designates the box-like base of a commercial telephone set, which includes the usual circuit closing and opening saddle 11 and the combined receiver and transmitter 12 which normally rests on the saddle 11.

My attachable service cabinet 13 also includes a box-like construction, sized to harmonize with the base 10, and which may be constructed of plastic or other material to provide side walls 14 and 15 and end walls 16 and 17 and a top 18.

The side walls 14 and 15 are constructed with integral drawer rests **14*a* and 15*a* which are parallel to each other, the front end wall 16 is formed with an opening 16*a* which receives the bottom sliding drawer 19 which has side grooves 19*a* and 19*b*, 19*b* is not shown, which engage the drawer rests 14*a* and 15*a*, in this same opening an upper drawer 20 is arranged to slide and is provided with side grooves 20*a* which engage the parallel drawer rests 14*c* and 15*c* of the side walls 14 and 15, this upper drawer is constructed shallow to receive stamps and small objects like bobby pins and the like, these two front sliding drawers have an equal length and are designed to fill about one half of the cabinet 13**.

Figures 1, 2, 3, 4, 5, 8:
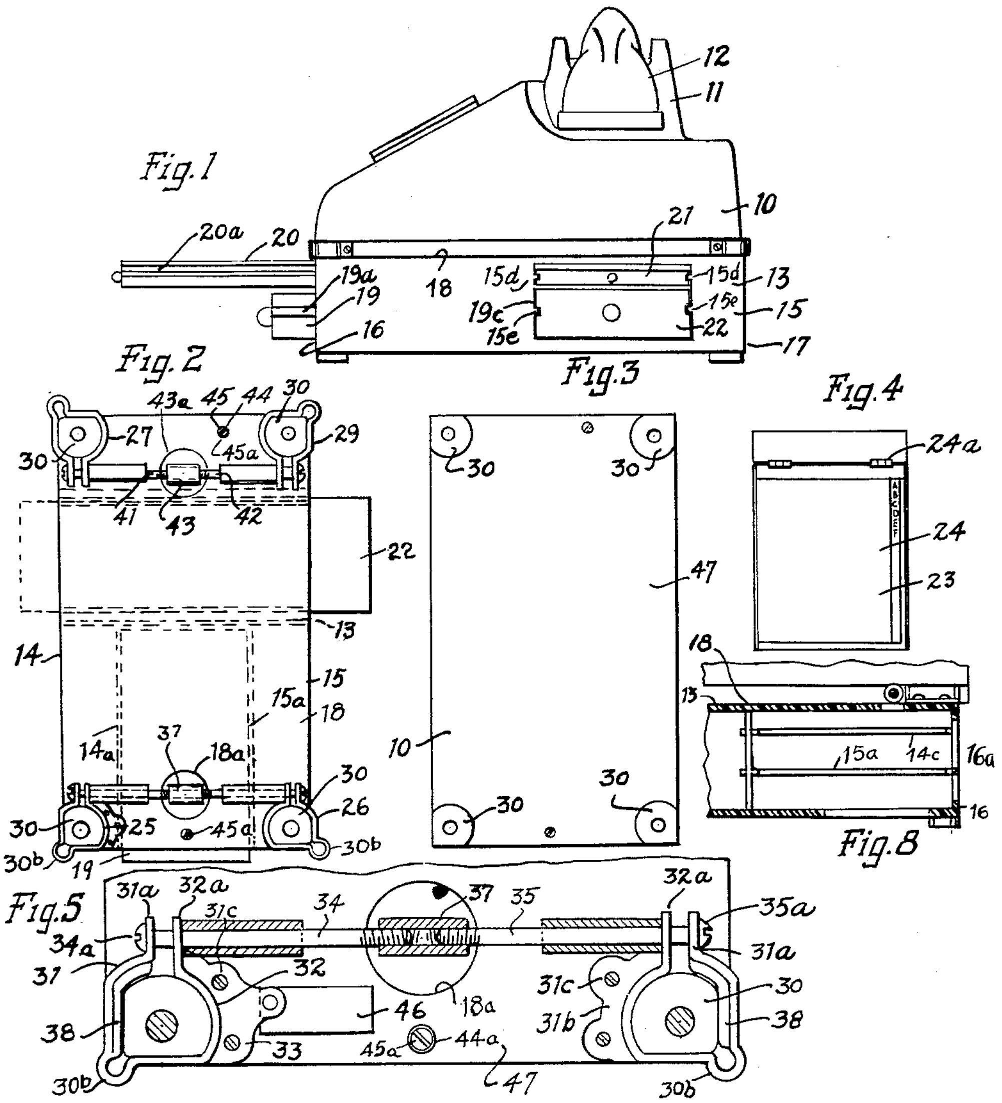
Fig. 1 is a side elevation of a telephone set provided with one form of the invention, and showing the forward drawers extended to partly open position.
Fig. 2 is a bottom plan view of a telephone set, showing the manner of coupling the service base to the pads thereof.
Fig. 3 is a bottom plan view of the telephone set.
Fig. 4 is a detail plan view of one of the drawers, showing a telephone index hinged thereon.
Fig. 5 is a horizontal sectional view, taken between the base of the telephone set and the top of the cabinet base, showing the manner of coupling the latter to the former, and shown enlarged.
Fig. 8 is a detail longitudinal sectional view, showing the construction of the plastic service base.
Figures 6, 7:
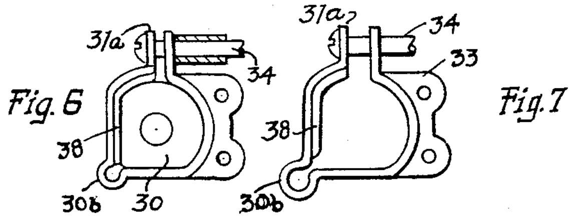
Fig. 6 is a detail plan view of one of the split ring clamps, showing the same in clamped engagement with a pad.
Fig. 7 is a similar view, showing the split ring before being clamped to the pad, and in open condition.

The right side wall 15 is formed with an opening **19*c* and drawers 21 and 22 slide through this opening at right angles to the drawers 19 and 20 and open at the right side of the cabinet base 13** as indicated in Fig. 1.

The upper drawer 21 slidably engages the drawer rests **15*d*, and the lower drawer 22 slidably engages the drawer rests 15*e* as shown in Fig. 1, in each the upper drawer is provided with a telephone index book 23, the front cover 24 of which may be hinged at 24*a* so that it may be lifted to provide access to the pages of the book, this front cover 24** also provides a writing surface for making notes of calls made and messages passed over the telephone.

The cabinet 13 is also provided on its top wall 18 and with two split ring clamps 25 and 26 at each end, each of those split ring clamps is located so that it will register with one of the corner pads 30 of the telephone base 10.

Each of the split ring clamps includes a flat metal band which provides confronting curved jaws 31 and 32 and connected to each other by means of a spring loop 33, the end of the jaw 31 is provided with a terminal lug **31*a* and the end of the jaw 32 is provided with a terminal lug 32*a* and those lugs are disposed in opposition to each other and spaced apart, the jaw 31 is also provided with a lateral flange 33 which is secured by fasteners 31*c* to the top wall 18 of the cabinet 13, this aids in securing the jaw against relative movement on the top wall 18**.

A screw 34 extends through the opposed lugs **31*a* and 32*a* of the split ring clamp 25, and the head 34*a* of this screw engages the lug 32*a*. A second screw 35 extends through the lugs 31*a* and 32*a* which engages the lug 32*a* of this clamp, those two screws are disposed in axial alignment and their inner ends are provided with right and left screw threads which are in turn engaged by the turnbuckle 37**.

The top wall 18 is formed with a finger opening to enable the user to manipulate the turnbuckle or sleeve nut 37. By tightening this turnbuckle or sleeve nut the movable outer jaw of each split ring clamp will be closed on the pad which is enclosed by the split ring, to increase the coupling thus obtained, the outer movable jaws is formed with an inset curved flange 38, adapted to be forced between the pad engaged thereby and the adjacent bottom wall of the telephone base.

The other two split ring clamps 27 and 29 are similarly constructed, and similarly attached to the top wall 18 of the cabinet 13. The terminal lugs of the movable jaws of those clamps are pierced by the right and left screws 41 and 42, in the same manner as previously described and the confronting inner ends of those screws are engaged by the turnbuckle or sleeve nut 43, and the top wall 18 is provided with a finger hole **43*a* to permit the user to engage this turnbuckle or sleeve nut from the inside of the cabinet 13. Each split ring clamp of this rear group is provided with an inset flange 38**, to wedge between the engaged pad and the bottom wall of the telephone base, in the manner previously described.

Additional holes 44 and **44*a* are provided in the top wall 18, to expose the screws 45 and 45*a* of the telephone base, by removing those screws or loosening them sufficiently, the heads may be withdrawn and split washers placed around the shanks of the screws which may then be tightened, so that the cabinet box 13 is secured directly to the base wall of the telephone base 10**.

In addition to this securing means, a permanent magnet 46 may be connected to one or more of the split ring clamps as shown in Fig. 5, so that it will have magnetic coupling with the metal plate 47 of the telephone base 10.

In this form of the invention the pads of the telephone base have a general shape or profile similar to that of a capital D. In the form of the invention shown in Figs. 10 to 17 inclusive, the pads 50 of the telephone base 51 have a triangular form.

Referring to Figs. 10 to 17, 52 designates the cabinet attachment of my invention, which is constructed substantially as previously described. To the forward end of the cabinet 52 a U-shaped metal clamping plate 53 is attached by the screws 54, which extend through the end wings **53*a* of the clamping plate, and each of those wings is formed with an inset edge flange 53*b*, which slidably engages the horizontal grooves 53*c*** of the cabinet, so that the load imposed on the screws will be distributed to the clamping plate wings.

The end wings **53*a* and the clamping plate 53 engage the outer right angular sides of the pads 50. The diagonal sides 50*a* of these pads at one end of the telephone base, are engaged by the diagonal legs 54*a* and 54*b* of the inner clamping plate 54, which has a central cross bar 54*c*, which is formed with extruded nuts 54*d*. This central cross bar is disposed in contiguous and parallel relation to the center bar of the outer clamping plate, and the clamping screws 55 are extended through this outer cross bar and engaged with the nuts 54*d***, and by tightening these screws the two clamping plates will be brought into pressure engagement with the triangular pads at one end of the cabinet base.

The other end of the cabinet base is similarly coupled by the inner clamping plate 56 and the outer clamping plate 57, to the other pads.

Each inner clamping plate or member is shown to be provided with a permanent magnet 58, which will attract the metal plate of the telephone base. The terminal diagonal legs of the inner clamping plate are formed with inset flanges 59 to wedge between the engaged pads and the telephone base, and the outer clamping plates are formed with inset flanges.

Having described my invention I claim as patentable:

A telephone base attachment comprising a utility cabinet, the upper surface of said cabinet forming a mounting plate, a plurality of split rings secured to said mounting plate, each split ring being provided with flanges spaced apart in opposition to each other, and including a fixed jaw and a movable jaw and adapted to be clamped about the base pad of a telephone base, oppositely threaded screws extending through said jaws of each split ring and extending toward each other and a turnbuckle threadedly engaging both screws to cause the screws to apply pressure on said jaws, and thereby clamp the utility cabinet to the telephone base.

References Cited in the file of this patent

UNITED STATES PATENTS

| | | |
|---|---|---|
| 2,283,690 | Munson | May 19, 1942 |
| 2,479,752 | Lohr | Aug. 23, 1949 |
| 2,498,770 | Sloane et al. | Feb. 28, 1950 |
| 2,582,562 | Rice | Jan. 15, 1952 |
| 2,586,543 | Kennedy | Feb. 19, 1952 |
| 2,608,024 | Torrence | Aug. 26, 1952 |
| 2,701,932 | Hyman | Feb. 15, 1955 |